(12) United States Patent
Takahashi

(10) Patent No.: US 10,038,222 B2
(45) Date of Patent: Jul. 31, 2018

(54) SECONDARY CELL STATE DETECTOR

(71) Applicant: YAZAKI CORPORATION, Tokyo (JP)

(72) Inventor: Yuichi Takahashi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 115 days.

(21) Appl. No.: 15/219,793

(22) Filed: Jul. 26, 2016

(65) Prior Publication Data

US 2017/0033416 A1    Feb. 2, 2017

(30) Foreign Application Priority Data

Jul. 30, 2015  (JP) .................................. 2015-150920

(51) Int. Cl.
| | |
|---|---|
| *G01R 31/36* | (2006.01) |
| *H01M 10/42* | (2006.01) |
| *B60K 6/22* | (2007.10) |
| *B60L 11/18* | (2006.01) |
| *H01M 10/48* | (2006.01) |

(52) U.S. Cl.
CPC ........... *H01M 10/4285* (2013.01); *B60K 6/22* (2013.01); *B60L 11/1861* (2013.01); *H01M 10/482* (2013.01); *B60Y 2200/91* (2013.01); *B60Y 2200/92* (2013.01); *B60Y 2400/308* (2013.01); *H01M 2220/20* (2013.01); *Y10S 903/904* (2013.01)

(58) Field of Classification Search
CPC .............. G01R 31/362; G01R 31/3679; G01R 31/3662; G01R 31/3606; G01R 31/3651; G01R 31/3658; G01R 31/3624; G01R 31/3627; G01R 31/3648

USPC ........ 324/426, 430, 432, 433, 382, 409–411, 324/678
See application file for complete search history.

(56) References Cited

U.S. PATENT DOCUMENTS

| | | | |
|---|---|---|---|
| 5,659,237 A * | 8/1997 | Divan | H02J 7/0018 320/119 |
| 6,504,857 B1 * | 1/2003 | Iwazaki | H01S 5/0021 372/38.02 |

(Continued)

FOREIGN PATENT DOCUMENTS

| | | |
|---|---|---|
| JP | 2001-24272 A | 1/2001 |
| JP | 2009-53012 A | 3/2009 |

(Continued)

OTHER PUBLICATIONS

Japanese Office Action for the related Japanese Patent Application No. 2015-150920 dated Jul. 28, 2017.

*Primary Examiner* — Jermele M Hollington
*Assistant Examiner* — Taqi Nasir
(74) *Attorney, Agent, or Firm* — Kenealy Vaidya LLP

(57) ABSTRACT

A condenser is connected to both electrodes of a secondary cell. A first switch is provided between a positive electrode of the secondary cell and a one-side plate of the condenser. An MCU turns ON the first switch when the secondary cell is in a first state to connect both electrodes of the secondary cell to both plates of the condenser, and then turns OFF the first switch. In addition, thereafter, the MCU detects a state of the secondary cell based on a differential voltage output from a differential amplifier circuit when the secondary cell is in a second state.

1 Claim, 3 Drawing Sheets

(56) References Cited

U.S. PATENT DOCUMENTS

| | | | | |
|---|---|---|---|---|
| 2001/0019270 A1* | 9/2001 | Onishi | ............... | G01R 31/3641 |
| | | | | 324/426 |
| 2002/0146600 A1* | 10/2002 | Vartak | ................... | H01M 10/42 |
| | | | | 429/9 |
| 2011/0019270 A1* | 1/2011 | Kitano | ..................... | G02B 3/08 |
| | | | | 359/361 |
| 2012/0146652 A1* | 6/2012 | Aoki | .................. | G01R 31/3658 |
| | | | | 324/433 |
| 2014/0225622 A1* | 8/2014 | Kudo | ................... | B60L 3/0046 |
| | | | | 324/433 |

FOREIGN PATENT DOCUMENTS

| | | | |
|---|---|---|---|
| JP | 2014-219311 A | 11/2014 | |
| JP | 2014219311 A * | 11/2014 | ......... G01R 31/3679 |

* cited by examiner

SECONDARY CELL STATE DETECTOR

CROSS REFERENCE

The present application claims priority to Japanese Patent Application No. 2015-150920 filed Jul. 30, 2015, which is hereby incorporated by reference in its entirety.

BACKGROUND

Technical Field

The present invention relates to a secondary cell state detector that detects a state of an electric cell such as a deterioration degree or an internal resistance of the electric cell.

Related Art

For example, a secondary cell such as a lithium-ion battery or a nickel-metal hydride battery is installed as a power source of an electric motor in various vehicles such as an electric vehicle (EV) driven using an electric motor, and a hybrid electric vehicle (HEV) driven using an engine together with an electric motor.

Such a secondary cell deteriorates through repeated charging and discharging, and a storage capacity (current capacity or power capacity) is known to gradually decrease. In addition, in the EV using the secondary cell, a storage capacity is obtained by detecting a deterioration degree of the secondary cell to calculate a distance at which the EV can be driven by the secondary cell, a life of the secondary cell, and the like.

A state of health (SOH) corresponding to a ratio of a current storage capacity to an initial storage capacity is a factor that indicates the deterioration degree of the secondary cell. The SOH is known to have a correlation with the internal resistance of the secondary cell. If the internal resistance of the secondary cell is obtained, the SOH may be detected based on the internal resistance.

For example, secondary cell state detectors described in JP 2014-219311 A and JP 2009-53012 A have been proposed as a device that detects the internal resistance of the secondary cell. Each of the secondary cell state detectors of JP 2014-219311 A and JP 2009-53012 A includes two condensers to hold respective cell voltages of two states of the secondary cell, for example, a discharge state and a discharge suspended state in the condensers, and amplifies a difference between the cell voltages held by the condenser using an amplifier, thereby accurately obtaining an internal resistance or an SOH.

However, in the conventional secondary cell state detectors, each of electrode-to-electrode voltages of the secondary cell in two states are sampled by two condensers, and then measured. For this reason, an interval of sampling by the two condensers needs to be set to greater than or equal to at least a time for charging the condensers plus a switching time of a switch. Thus, there is a problem that a differential voltage cannot be continuously measured at a high speed.

Patent Literature 1: JP 2014-219311 A
Patent Literature 2: JP 2009-53012 A

SUMMARY

In this regard, an object of the invention is to provide a secondary cell state detector capable of measuring a differential voltage at a high speed.

In order to solve the above issue, the invention according to a first aspect is a secondary cell state detector that detects a state of a secondary cell, and includes: a condenser connected to both electrodes of the secondary cell; a first switch provided between a one-side electrode of the secondary cell and a one-side plate of the condenser; a first switch control unit that turns ON the first switch when the secondary cell is in a first state to connect the both electrodes of the secondary cell to both plates of the condenser, and then turns OFF the first switch; a differential amplifier circuit having a first input to which the one-side plate of the condenser is connected and a second input to which the one-side electrode of the secondary cell is connected, the differential amplifier circuit outputting a differential voltage of the first input and the second input; and a cell state detecting unit that detects the state of the secondary cell based on the differential voltage when the secondary cell is in a second state after control by the first switch control unit.

The invention according to a second aspect is the secondary cell state detector according to the first aspect, further including: a second switch provided between the both plates of the condenser; a second switch control unit that turns ON the second switch; and an electrode-to-electrode voltage detecting unit that detects an electrode-to-electrode voltage of the secondary cell based on the differential voltage when the second switch is turned ON.

As described in the foregoing, according to the invention according to the first aspect, a one-side electrode of a secondary cell is connected to a second input of a differential amplifier circuit, and thus it is possible to detect a state of a secondary cell from a differential voltage at a high speed without waiting for a time for charging a condenser in a second state.

According to the invention according to the second aspect, both electrodes of a secondary cell are connected to a first input and a second input of a differential amplifier circuit when a second switch is turned ON, and thus it is possible to detect an electrode-to-electrode voltage of a secondary cell without waiting for a time for charging a condenser.

DETAILED DESCRIPTION

A description will hereinafter be given of a secondary cell state detector of the invention with reference to FIG. 1. For example, a secondary cell state detector 1 of the present embodiment is installed in an electric vehicle to detect respective states of a plurality of secondary cells Ce1 to Cen included in the electric vehicle. The plurality of secondary cells Ce1 to Cen is connected to one another in series.

Figure 1:
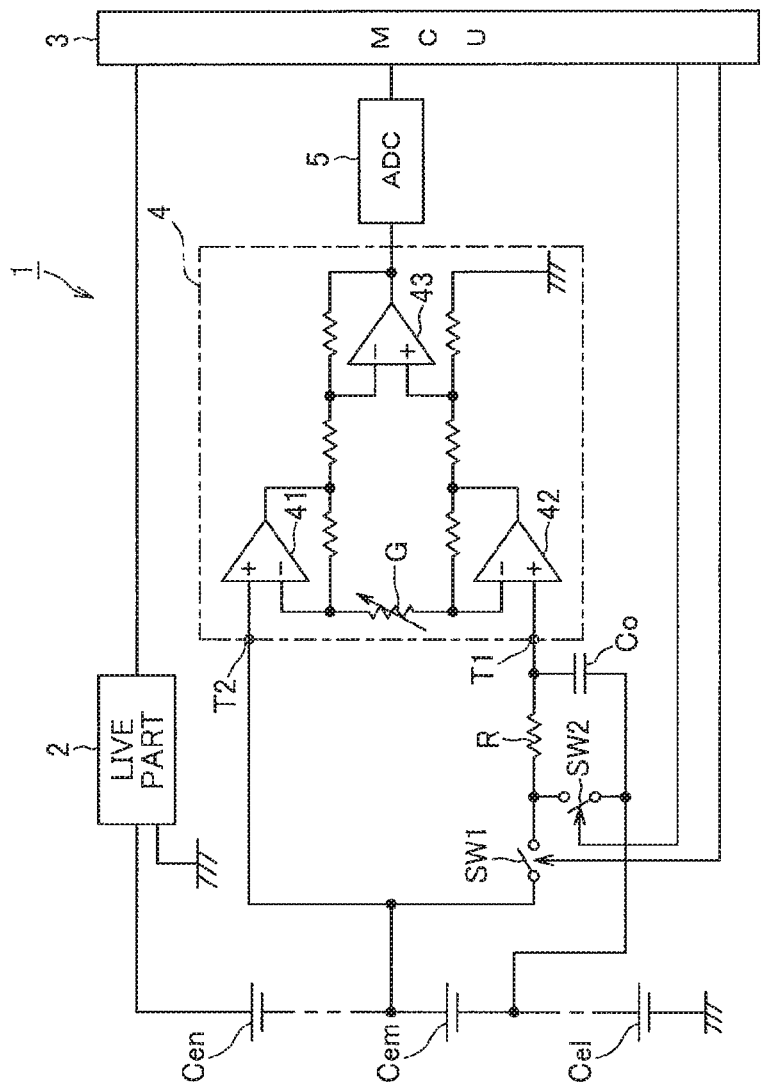
FIG. 1 is a circuit diagram illustrating an embodiment of a secondary cell state detector of the invention.

As illustrated in FIG. 1, the secondary cell state detector 1 includes a condenser Co, a first switch SW1, a second switch SW2, a live part 2, an MCU 3 serving as a first switch control unit, a second switch control unit, a cell state detecting unit, and an electrode-to-electrode voltage detecting unit, a differential amplifier circuit 4, an AD converter 5 (hereinafter abbreviated to ADC 5) that AD converts an output of the differential amplifier circuit 4 and supplies the converted output to the MCU 3, and a resistor R.

In the present embodiment, a plurality of condensers Co is provided to correspond to a plurality of secondary cells Ce1 to Cen (n is an arbitrary integer). Both plates of the plurality of condensers Co are connected to both electrodes of the corresponding secondary cells Ce1 to Cen. The first switch SW1 is provided between a positive electrode (one-side electrode) of a corresponding one of the secondary cells Ce1 to Cen and a one-side plate of a condenser Co. The second switch SW2 is provided between the both plates of the condenser Co.

The live part 2 is provided to be able to allow a predetermined charging current Ic to flow at the time of charging the plurality of secondary cells Ce1 to Cen. The live part 2 is connected to the MCU 3 described below. In response to a control signal from the MCU 3, the live part 2 charges the secondary cells Ce by allowing the charging current Ic to flow through the secondary cells Ce and suspends charging by suspending flowing of the charging current Ic to the secondary cells Ce.

The MCU 3 includes a microcomputer having a CPU, a ROM, a RAM, and the like which are widely known. The MCU 3 performs on-off control on the first and second switches SW1 and SW2, and controls the live part 2.

Upon receiving a state detection command from an electronic controller, the MCU 3 turns ON the first switch SW1 when the secondary cell Ce is in a first state to hold an electrode-to-electrode voltage of the secondary cell Ce in the first state in the condenser Co, and then turns OFF the first switch SW1. Thereafter, the MCU 3 detects a state (internal resistance) of the secondary cell based on a differential voltage from the differential amplifier circuit 4 described below when the secondary cell Ce is in a second state. Herein, the first state and the second state indicate states in which currents flowing through the secondary cell Ce are different from each other. In the present embodiment, a charge state in which the charging current Ic flows through the secondary cell Ce is set as the first state, and a charge suspended state in which no current flows through the secondary cell Ce is set as the second state.

In addition, upon receiving a command to detect an electrode-to-electrode voltage from the electronic controller, the MCU 3 turns OFF the first switch SW1, turns ON the second switch SW2, and then fetches the differential voltage from the differential amplifier circuit 4 described below as the electrode-to-electrode voltage of the secondary cell Ce.

In the present embodiment, a plurality of differential amplifier circuits 4 is provided to correspond to the plurality of secondary cells Ce1 to Cen. The one-side plate of the condenser Co corresponding to a first input T1 is connected to the differential amplifier circuit 4, a positive electrode of the secondary cells Ce1 to Cen corresponding to a second input T2 is connected to the differential amplifier circuit 4, and the differential amplifier circuit 4 outputs a differential voltage of the first input T1 and the second input T2.

The differential amplifier circuit 4 of the present embodiment includes a so-called instrumentation amplifier, and has a first amplifier 41, a second amplifier 42, and a differential amplifier 43. A non-inverting input of the first amplifier 41 corresponds to the first input T1, and the first amplifier 41 amplifies a voltage input to the first input T1. A non-inverting input of the second amplifier 42 corresponds to the second input T2, and the second amplifier 42 amplifies a voltage input to the second input T2. The differential amplifier 43 amplifies a difference between the voltages input to the first and second inputs T1 and T2 and amplifies by the first and second amplifiers 41 and 42, and outputs the difference as a differential voltage.

In addition, in the differential amplifier circuit 4 of the present embodiment, a variable resistor G is provided between an inverting input of the first amplifier 41 and an inverting input of the second amplifier 42, and an amplification factor may be adjusted.

The resistor R is a current controlling resistor provided between the first and second switches SW1 and SW2 and the one-side plate of the condenser Co.

Figure 2:
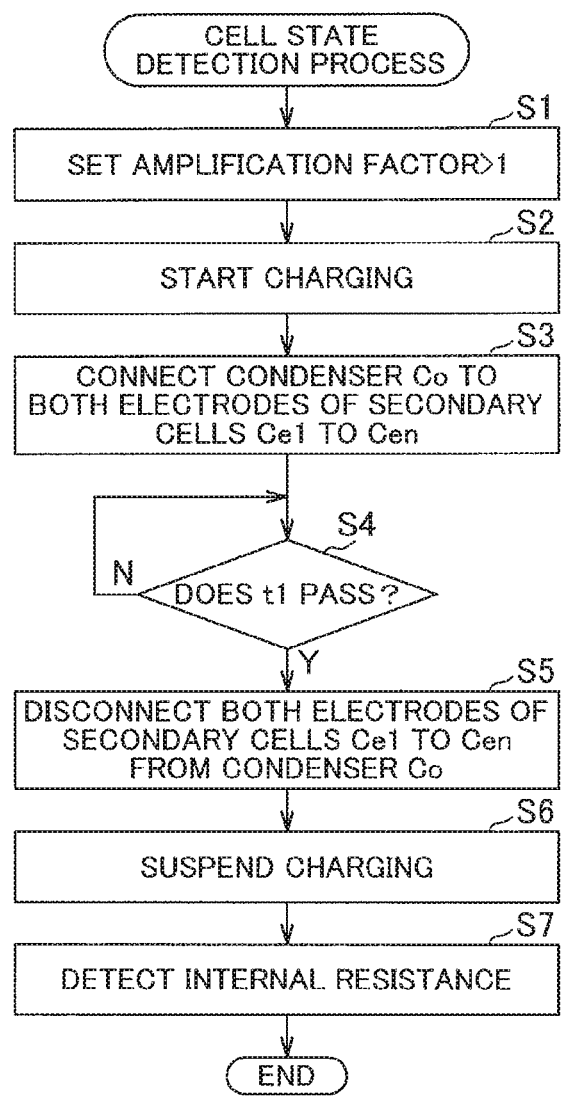
FIG. 2 is a flowchart illustrating a procedure of a secondary cell state detection process of an MCU illustrated in FIG. 1.
Figure 3:
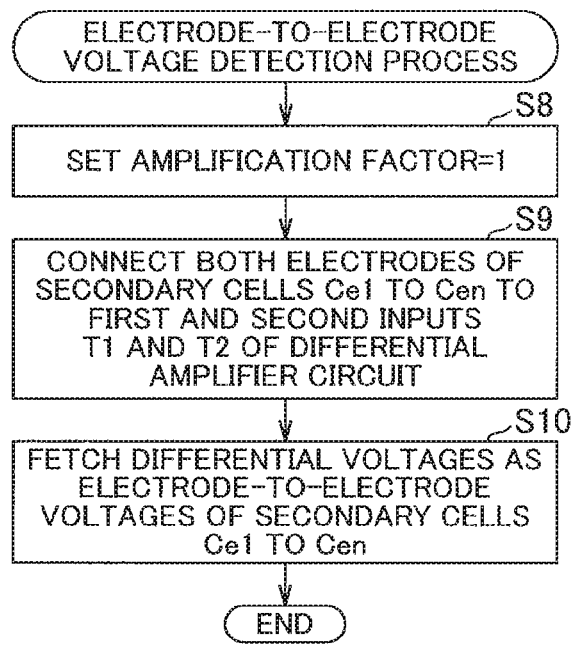
FIG. 3 is a flowchart illustrating a procedure of an electrode-to-electrode voltage detection process of the MCU illustrated in FIG. 1.

Next, a description will hereinafter be given of operation of the secondary cell state detector 1 having the above-described configuration with reference to FIG. 2 and FIG. 3. FIG. 2 is a flowchart illustrating a procedure of a secondary cell state detection process of the MCU 3 illustrated in FIG. 1. FIG. 3 is a flowchart illustrating a procedure of an electrode-to-electrode voltage detection process of the MCU 3 illustrated in FIG. 1.

Upon receiving a state detection command from an electronic controller installed in a vehicle, the MCU 3 starts the cell state detection process illustrated in FIG. 2. First, the MCU 3 adjusts the variable resistor G to set an amplification factor of the differential amplifier circuit 4 to a predetermined value greater than 1 (step S1). Subsequently, the MCU 3 transmits a charge start control signal to the live part 2 (step S2). The live part 2 starts to charge the secondary cells Ce1 to Cen with the charging current Ic in response to the control signal.

Subsequently, the MCU 3 turns ON the first switch SW1, and turns OFF the second switch SW2, thereby connecting both plates of corresponding condensers Co to both electrodes of the secondary cells Ce1 to Cen (step S3). Thereafter, when a sufficient time t1, during which a voltage across both plates of the condenser Co reaches electrode-to-electrode voltages of the secondary cells Ce1 to Cen, passes (Y in step S4), the MCU 3 turns OFF the first switch SW1 to disconnect the both electrodes of the secondary cells Ce1 to Cen from the corresponding condensers Co (step S5). In this way, the electrode-to-electrode voltages of the secondary cells Ce1 to Cen in the charge state are held in the condensers Co. respectively.

Thereafter, the MCU 3 transmits a charge suspension control signal to the live part 2 (step S6). The live part 2 suspends charging of the secondary cells Ce1 to Cen in response to the control signal. In this way, the secondary cells Ce1 to Cen are in the charge suspended state. Thus, the MCU 3 detects states (internal resistances) of the secondary cells Ce1 to Cen based on differential voltages output from the respective differential amplifier circuits 4 at this time (step S7), and terminates the process.

A positive electrode of a secondary cell Cem (m is an arbitrary integer in a range of 1 to n) is connected to a second input T2 of each of the differential amplifier circuits 4. That is, in this instance, a sum $Vd1+ \ldots +Vdm$ of electrode-to-electrode voltages $Vd1$ to $Vdm$ of secondary cells Ce1 to Cem in the charge suspended state is supplied to the second input T2.

Meanwhile, a one-side plate of a condenser Co in which an electrode-to-electrode voltage of a secondary cell Cem in the charge state is held is connected to a first input T1 of each of the differential amplifier circuits 4. That is, in this instance, a value $(Vd1+ \ldots +Vdm-1+Vcm)$, which is obtained by adding the electrode-to-electrode voltage Vcm of the secondary cell Cem in the charge state held by the condenser Co to a sum Vd1+ . . . +Vdm−1 of electrode-to-electrode voltages Vd1 to Vdm−1 of secondary cells Ce1 to Cem−1 in the charge suspended state, is supplied to the first input T1. Therefore, in this instance, a differential voltage output from the differential amplifier circuit 4 is a difference Vcm−Vdm between an electrode-to-electrode voltage Vcm of a secondary cell Cem in the charge state and an electrode-to-electrode voltage Vdm of the secondary cell Cem in the charge suspended state, and is a value corresponding to an internal resistance of a secondary cell Cem.

Meanwhile, upon receiving an electrode-to-electrode voltage detection command from the electronic controller installed in the vehicle, the MCU 3 starts the electrode-to-electrode voltage detection process illustrated in FIG. 3. First, the MCU 3 controls the variable resistor G to set an amplification factor of the differential amplifier circuit 4 to 1 (step S8). Subsequently, the MCU 3 turns ON the second switch SW2 to connect both electrodes of the secondary cells Ce1 to Cen to the first input T1 and the second input T2 of the corresponding differential amplifier circuit 4 (step S9). Consequently, an electrode-to-electrode voltage of the secondary cells Ce1 to Cen is output as a differential voltage from the differential amplifier circuit 4.

Subsequently, the MCU 3 fetches a differential voltage output from each differential amplifier circuit 4 as an electrode-to-electrode voltage of the secondary cells Ce1 to Cen (step S10), and terminates the electrode-to-electrode voltage detection process.

According to the above-described embodiment, a positive electrode of the secondary cells Ce1 to Cen is connected to the second input T2 of the differential amplifier circuit 4, and thus a differential voltage may be measured at a high speed without waiting for a time for charging the condenser Co in the charge suspended state.

In addition, according to the above-described embodiment, when the second switch SW2 is turned ON, both electrodes of the secondary cells Ce1 to Cen are connected to the first input T1 and the second input T2 of the differential amplifier circuit 4, respectively, and thus electrode-to-electrode voltages of secondary cells Ce1 and Ce2 may be detected without waiting for a time for charging the condenser Co.

In the above-described embodiment, differential voltages of the electrode-to-electrode voltages of the secondary cells Ce1 to Cen in the charge state (first state) and the charge suspended state (second state) are obtained. However, the invention is not limited thereto. Differential voltages of electrode-to-electrode voltages of the secondary cells Ce1 to Cen in two different states may be output from the differential amplifier circuits 4. For example, differential voltages of electrode-to-electrode voltages of the secondary cells Ce1 to Cen in a charge state and a discharge state may be output from the differential amplifier circuits 4. Alternatively, differential voltages of electrode-to-electrode voltages of the secondary cells Ce1 to Cen in a charge state in which a large charging current flows and a charge state in which a small charging current flows may be output from the differential amplifier circuits 4. Alternatively, differential voltages of electrode-to-electrode voltages of the secondary cells Ce1 to Cen in a discharge state in which a large discharging current flows and a discharge state in which a small discharging current flows may be output from the differential amplifier circuits 4.

Figure 4:
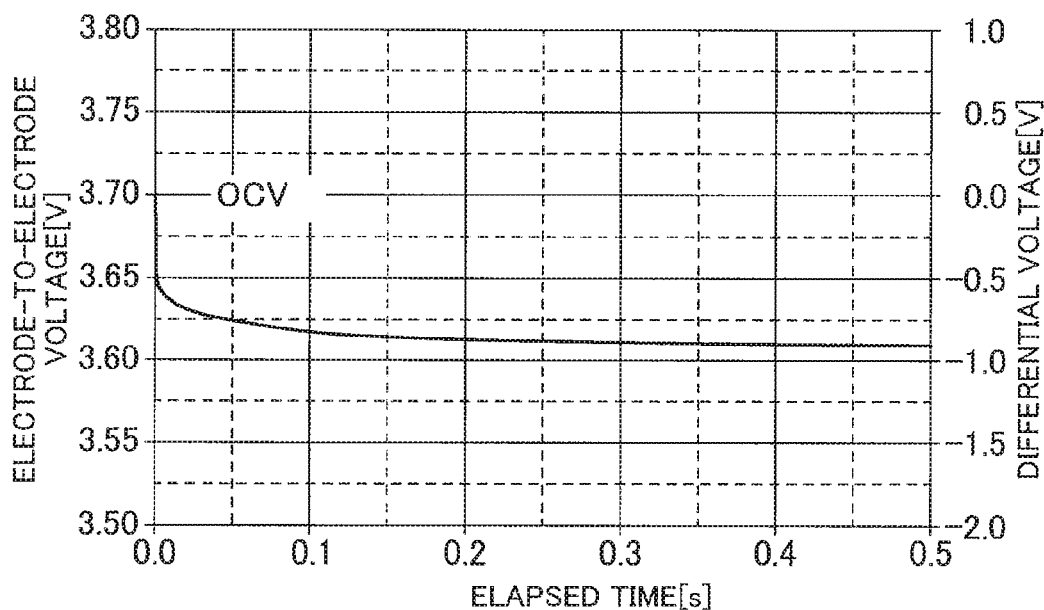
FIG. 4 is a timing chart of an electrode-to-electrode voltage of a secondary cell for describing a procedure of a secondary cell state detection process in another embodiment.

In addition, in the above-described embodiment, the internal resistances of the secondary cells Ce1 to Cen are obtained only from differential voltages of electrode-to-electrode voltages of the secondary cells Ce1 to Cen in two states. However, the invention is not limited thereto. For example, capacitive components may be connected to internal resistors of the secondary cells Ce1 to Cen. For this reason, when discharged from the secondary cells Ce1 to Cen in an idle state (state in which not current flows), even when the discharging current Id is constant, electrode-to-electrode voltages of the secondary cells Ce1 to Cen decrease transitionally rather than rapidly by a voltage drop of an internal resistance due to the flowing discharging current Id as indicated by a solid line of FIG. 4.

In this regard, there is a known method in which a plurality of transitional decrements is sampled from the electrode-to-electrode voltages (that is, open-circuit voltages (OCVs)) of the secondary cells Ce1 to Cen in the idle state, and the internal resistances of the secondary cells Ce1 to Cen are detected from a plurality of sampling values thereof (transient response method). The above-described secondary cell state detector 1 illustrated in FIG. 1 is most suitable for detection of the internal resistances of the secondary cells Ce1 to Cen using the transient response method that needs to sample differential voltages at a high speed after starting discharging.

Specifically, the MCU 3 turns ON the first switch SW1 in the idle state before discharging is started to hold the electrode-to-electrode voltages (OCVs) of the secondary cells Ce1 to Cen in the idle state in the condenser Co, and then turns OFF the first switch SW1. Thereafter, when discharging starts, the MCU 3 samples differential voltages output from the differential amplifier circuit 4, and detects internal resistances of the secondary cells Ce1 to Cen based on a plurality of sampling values thereof. After discharging, the differential voltages output from the differential amplifier circuit 4 are decrements from the OCVs of the electrode-to-electrode voltages of the secondary cells Ce1 to Cen in the discharge state.

In addition, according to the above-described embodiment, a plurality of first switches SW1, second switches SW2, condensers Co, differential amplifier circuits 4, and ADCs 5 are provided to correspond to the plurality of respective secondary cells Ce1 to Cen. However, the invention is not limited thereto. One first switch SW1, second switch SW2, condenser Co1, differential amplifier circuit 4, and ADC 5 may be provided to correspond to the plurality of secondary cells Ce1 to Cen, and the plurality of secondary cells Ce1 to Cen may be successively connected to the condenser Co and the differential amplifier circuit 4.

In addition, according to the above-described embodiment, the second switch SW2 is provided. However, the second switch SW2 may not be provided. Only the first switch SW1 may be provided.

Further, the above-described embodiment merely illustrates a representative embodiment of the invention, and the invention is not restricted to the embodiments. That is, the embodiment may be variously modified and implemented within a range not departing from the subject matter of the invention.

REFERENCE SIGNS LIST 1 secondary cell state detector
3 MCU (first switch control unit, cell state detecting unit, second switch control unit, and electrode-to-electrode voltage detecting unit)
4 differential amplifier circuit
Ce1 to Cen secondary cell Co condenser
SW1 first switch
SW2 second switch
T1 first input
T2 second input

What is claimed is:

1. A secondary cell state detector that detects a state of a secondary cell, the secondary cell state detector comprising:
   a condenser connected to both electrodes of the secondary cell;
   a first switch provided between a one-side electrode of the secondary cell and a one-side plate of the condenser;
   a first switch control unit turning ON the first switch when the secondary cell is in a first state to connect the both electrodes of the secondary cell to both plates of the condenser, and then turning OFF the first switch;
   a differential amplifier circuit having a first input to which the one-side plate of the condenser is connected and a second input to which the one-side electrode of the secondary cell is directly connected, the differential amplifier circuit outputting a differential voltage of the first input and the second input;
   a cell state detecting unit detecting the state of the secondary cell based on the differential voltage when the secondary cell is in a second state after the first switch control unit executes control;
   a second switch provided between the both plates of the condenser;
   a second switch control unit turning ON the second switch; and
   an electrode-to-electrode voltage detecting unit detecting an electrode-to-electrode voltage of the secondary cell based on the differential voltage when the second switch is turned ON.

* * * * *